United States Patent
Nishizawa et al.

(10) Patent No.: US 7,838,451 B2
(45) Date of Patent: Nov. 23, 2010

(54) ALKALI-FREE GLASS AND LIQUID CRYSTAL DISPLAY PANEL

(75) Inventors: Manabu Nishizawa, Yokohama (JP); Junichiro Kase, Yokohama (JP); Kazuhiro Suzuki, Yokohama (JP); Kei Maeda, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 548 days.

(21) Appl. No.: 11/472,352

(22) Filed: Jun. 22, 2006

(65) Prior Publication Data

US 2007/0027019 A1    Feb. 1, 2007

Related U.S. Application Data

(63) Continuation of application No. PCT/JP2004/019378, filed on Dec. 24, 2004.

(30) Foreign Application Priority Data

Dec. 26, 2003 (JP) .............................. 2003-434936
Apr. 21, 2004 (JP) .............................. 2004-125732

(51) Int. Cl.
C03C 3/089 (2006.01)
C03C 3/091 (2006.01)

(52) U.S. Cl. .................................. 501/65; 501/66

(58) Field of Classification Search ........... 501/65, 501/66, 67
See application file for complete search history.

(56) References Cited

U.S. PATENT DOCUMENTS

| | | | |
|---|---|---|---|
| 5,116,788 A | | 5/1992 | Dumbaugh, Jr. |
| 5,153,151 A * | | 10/1992 | Aitken ..................... 501/45 |
| 5,244,847 A | | 9/1993 | Kushitani et al. |
| 5,348,916 A | | 9/1994 | Kushitani et al. |
| 5,374,595 A * | | 12/1994 | Dumbaugh et al. ......... 501/66 |
| 5,489,558 A * | | 2/1996 | Moffatt et al. ............. 501/69 |
| 5,508,237 A * | | 4/1996 | Moffatt et al. ............. 501/69 |
| 5,770,535 A * | | 6/1998 | Brix et al. ................. 501/67 |
| 5,801,109 A * | | 9/1998 | Nishizawa et al. .......... 501/66 |
| 5,885,914 A | | 3/1999 | Nishizawa et al. |
| 6,060,168 A | | 5/2000 | Kohli |
| 6,096,670 A | | 8/2000 | Lautenschläger et al. |
| 6,169,047 B1 | | 1/2001 | Nishizawa et al. |
| 6,319,867 B1 * | | 11/2001 | Chacon et al. ............. 501/66 |
| 6,417,124 B1 * | | 7/2002 | Peuchert et al. ........... 501/66 |
| 6,465,381 B1 * | | 10/2002 | Lautenschlager et al. ..... 501/67 |
| 6,468,933 B1 * | | 10/2002 | Narita et al. .............. 501/56 |
| 6,508,083 B1 * | | 1/2003 | Naka et al. ............... 65/134.3 |
| 6,537,937 B1 | | 3/2003 | Nishizawa et al. |
| 6,664,203 B2 | | 12/2003 | Nagashima et al. ......... 501/66 |
| 6,671,026 B2 * | | 12/2003 | Peuchert et al. ........... 349/158 |
| 6,858,552 B2 * | | 2/2005 | Peuchert .................. 501/66 |
| 6,867,158 B2 * | | 3/2005 | Peuchert et al. ........... 501/67 |
| 7,153,797 B2 * | | 12/2006 | Peuchert .................. 501/66 |
| 7,358,205 B2 * | | 4/2008 | Narita et al. .............. 501/66 |
| 7,365,038 B2 * | | 4/2008 | Chacon et al. ............. 501/66 |
| 2002/0013210 A1 * | | 1/2002 | Peuchert et al. ........... 501/66 |
| 2002/0082158 A1 * | | 6/2002 | Chacon et al. ............. 501/66 |
| 2002/0183188 A1 * | | 12/2002 | Peuchert .................. 501/66 |
| 2004/0018934 A1 * | | 1/2004 | Ott et al. ................. 501/66 |
| 2005/0026767 A1 * | | 2/2005 | Takase et al. ............. 501/56 |
| 2005/0065014 A1 * | | 3/2005 | Narita et al. .............. 501/66 |
| 2005/0101469 A1 * | | 5/2005 | Peuchert et al. ........... 501/66 |
| 2006/0003884 A1 | | 1/2006 | Nishizawa et al. |
| 2006/0293162 A1 * | | 12/2006 | Ellison ................... 501/66 |
| 2007/0027019 A1 * | | 2/2007 | Nishizawa et al. .......... 501/65 |
| 2007/0191207 A1 * | | 8/2007 | Danielson et al. .......... 501/66 |
| 2008/0160221 A1 * | | 7/2008 | Chacon et al. ............ 428/1.23 |

FOREIGN PATENT DOCUMENTS

| | | |
|---|---|---|
| EP | 0 559 389 A2 | 9/1993 |
| EP | 0 672 629 A2 | 9/1995 |
| EP | 0 714 862 A1 | 6/1996 |
| EP | 1 118 594 A2 | 7/2001 |
| JP | 6-263473 | 9/1994 |
| JP | 11-157869 | 6/1999 |

OTHER PUBLICATIONS

U.S. Appl. No. 11/934,138, filed Nov. 2, 2007, Suzuki et al.
U.S. Appl. No. 11/969,532, filed Jan. 4, 2008, Nishizawa et al.
U.S. Appl. No. 08/867,958, filed Jun. 3, 1997, Nishizawa et al.
U.S. Appl. No. 08/563,824, filed Nov. 28, 1995, Nishizawa et al.
A. P. Stepanov, et al., "Nuclear Magnetic Resonance of $B^{11}$ in an Aluminoborosilicate Glass Fiber", Soviet Physics- Solid State, XP008104460, vol. 11, No. 7, 1970, pp. 1660-1661.
N. N. Ermolenko, "Code (table number) 3804, Glass No. 84052", Sciglass Database, XP002521162, 1975, No. 4, 2 pages.
A. D. Orlov, "Code (table number) 25355, Glass No. 350943", Sciglass Database, XP002521167, 1991, 1 page.

* cited by examiner

*Primary Examiner*—Karl E Group
*Assistant Examiner*—Elizabeth A Bolden
(74) *Attorney, Agent, or Firm*—Oblon, Spivak, McClelland, Maier & Neustadt, L.L.P.

(57) ABSTRACT

To provide an alkali-free glass excellent in the properties for glass substrates to be used for display, excellent in the resistance to reduction, and suitable for forming by a float process.

An alkali-free glass consisting essentially of, as represented by mol %:

| | |
|---|---|
| $SiO_2$ | at least 60% and less than 66%, |
| $Al_2O_3$ | 0 to 12%, |
| $B_2O_3$ | 5 to 10%, |
| MgO | 0 to 18%, |
| CaO | 0 to 18%, |
| SrO | 0 to 18%, |
| BaO | 0 to 6%, |
| CaO + SrO | 10 to 25%, |
| MgO + CaO + SrO + BaO | 15.5 to 30% | and containing substantially no alkali metal oxide.

12 Claims, No Drawings

ALKALI-FREE GLASS AND LIQUID CRYSTAL DISPLAY PANEL

TECHNICAL FIELD

The present invention relates to an alkali-free glass which is suitable for glass substrates for various display devices such as liquid crystal display devices, or photomasks, and which contains substantially no alkali metal oxide and can be formed by a float process, and a liquid crystal display panel using it.

BACKGROUND ART

Heretofore, the following properties have been required for a glass substrate to be used for display devices such as liquid crystal display devices, particularly for a glass substrate designed to have a thin film of a metal or oxide formed on their surface.

(1) It contains substantially no alkali metal ion (i.e. it is alkali-free glass).

If a glass substrate contains alkali metal oxides, alkali metal ions are likely to diffuse into the above thin film thereby to deteriorate the properties of the thin film.

(2) It has a high strain point, so that deformation of a glass substrate and shrinkage (heat shrinkage) accompanied by stabilization of the glass structure due to heating during the process for forming the thin film, can be suppressed to the minimum level.

(3) It has adequate chemical durability against various chemicals to be used for formation of semiconductors. Especially, it has the chemical durability against buffered hydrofluoric acid (BHF: hydrofluoric acid+ammonium fluoride) to be used for etching of $SiO_x$ or $SiN_x$, chemicals containing hydrochloric acid to be used for etching of ITO (tin-doped indium oxide), various acids (e.g. nitric acid, sulfuric acid) to be used for etching of a metal electrode, or a resist-removing alkaline liquid.

(4) It has no defects (e.g. bubbles, stria, inclusions, pits or flaws) inside or on the surface.

In recent years, a glass satisfying the following properties as well as the above, has been desired.

(5) A display has been required to have its weight reduced, and glass itself has been also desired to be a glass having a low density.

(6) As a method for reducing the weight of a display, it has been desired to reduce the thickness of a glass substrate.

(7) In order to increase the high productivity or improve the thermal shock resistance by increasing the temperature rising or falling rate at the time of heat treatment for producing the liquid crystal display, a glass having a small linear expansion coefficient has been required.

(8) As liquid crystal TV sets are widely used and are made to have a large size, a glass substrate has been required to have a large area of 2 m square from 1 m square of a conventional glass substrate. When a display using such a large substrate is to be prepared, the glass substrate has been required to have a high Young's modulus so as to reduce deflection of the glass substrate by its own weight at the time of transportation.

(9) A glass substrate has been required to have a high strength so as not to be broken by an external force or shock exerted during the use of the liquid crystal display product.

As a method for forming glass, a float process has been widely used wherein glass is formed on molten tin, but in such a process, glass is exposed to a reducing atmosphere as an atmosphere of a mixture of nitrogen with hydrogen at a relatively high temperature (a temperature ($T_4$) at which the glass viscosity is in the vicinity of log $\eta=4$ (poise)), whereby the glass surface is susceptible to a reducing effect. Such a reducing effect presents various adverse affects to the glass. For example, the interaction between $S^{2-}$ and $Fe^{2+}$ which are produced by reduction of $SO_4^{2-}$ which is dissolved in glass as an impurity, causes coloration (amber coloration), or Fe ions in glass tend to be metallized and precipitated and thereby become starting points for devitrification or starting points for precipitated crystals at the time of immersion into BHF, thus leading to deterioration of the BHF resistance (turbidity in glass).

An alkali-free glass or a glass composition containing no alkali metal oxide, is disclosed in e.g. Patent Documents 1 to 13. However, the glass composition disclosed in the Patent Documents 1 and 2 has a small content of $SiO_2$, whereby the acid resistance is insufficient. Further, the content of $B_2O_3$ is large, whereby the acid resistance is poor and the Young's modulus is also low.

The glass composition disclosed in each of Patent Documents 3 and 4 contains BaO as the main alkaline earth metal oxide in its composition, whereby the density of glass to be produced becomes large.

Further, the alkali-free glass disclosed in Examples in each of Patent Documents 7 and 8, is one having poor properties as a glass substrate for display devices. For example, the glass disclosed in each of Examples 20, 28, 29 and 42 contains $Al_2O_3$ in a large amount, and therefore the BHF resistance and devitrification property are poor.

As the alkali-free glass disclosed in Patent Document 9, for example, the glass in each of Examples 12 and 17 contains $Al_2O_3$ in a large amount, and it tends to be disadvantageous with respect to the BHF resistance and devitrification property.

Further, also as the alkali-free glass substrate disclosed in Patent Document 10, one having poor properties as a glass substrate for display devices is disclosed in Examples. For example, the glass in each of Examples 1 to 9 and Example 12 contains $B_2O_3$ in a small amount, whereby the BHF resistance and devitrification property are poor.

Further, as the alkali-free glass disclosed in Patent Document 11, one having poor properties as a glass substrate for display devices is disclosed in Examples. For example, the glass in each of Examples 4 to 7 has $B_2O_3$ in a large amount, whereby the acid resistance is poor and the Young's modulus is also low.

Further, as the alkali-free glass disclosed in Patent Document 12, one having poor properties as a glass substrate for display devices is disclosed in Examples. For example, the glass disclosed as sample No. 12 contains $SiO_2$ in a small amount, whereby the acid resistance is poor.

Further, in any of Patent Documents 1 to 13, there is no description relating to the reducing resistance of alkali-free glass. Namely, in the prior art, no studies have been conducted at all on improvement of the reducing resistance of an alkali-free glass in order to solve the above problems occurred at the time of forming by a float process.

Patent Document 1: JP-A-6-56469
Patent Document 2: U.S. Pat. No. 5,506,180
Patent Document 3: JP-A-7-300336
Patent Document 4: EP 0,559,389
Patent Document 5: JP-A-11-157869
Patent Document 6: U.S. Pat. No. 6,096,670
Patent Document 7: JP-A-8-109037
Patent Document 8: U.S. Pat. No. 5,508,237
Patent Document 9: JP-A-9-169539
Patent Document 10: JP-A-9-156953
Patent Document 11: JP-A-4-325436

Patent Document 12: JP-A-2000-159541
Patent Document 13: JP-A-2001-220173

DISCLOSURE OF THE INVENTION

Object to be Accomplished by the Invention

In order to solve the above problems of the prior art, it is an object of the present invention to provide an alkali-free glass excellent in properties for glass substrates for display devices, excellent in the reducing resistance, and suitable for formation by a float process.

Means to Accomplish the Object

The present inventors have conducted extensive studies to achieve the above object, and as a result, have found that the reducing resistance of glass can be improved when the glass composition is made to be a composition having a high basicity. The method to make the glass composition to be a composition having a high basicity, may be a method of increasing the content of an alkaline earth metal oxide (hereinafter referred to also as "RO"), or a method of using, as RO, a heavy element having a large atomic weight among alkaline earth metals.

However, when glass is made to have a composition having a high basicity, there may be a case where the properties required for a glass substrate for display devices will be adversely affected. For example, the increase of the content of the alkaline earth metal oxide brings about problems such as a decrease of the strain point (against the above (2)), deterioration of the chemical durability (against the above (3)), an increase of the density (against the above (5)), an increase of the linear expansion coefficient (against the above (7)). In addition, the devitrification properties of the glass deteriorates.

In order to solve the above problems in a case where glass has a composition having a high basicity, the present inventors have further conducted extensive studies, and as a result, have found the following. (1) It is preferred not to incorporate BaO, since it increases the density of glass, (2) it is preferred to incorporate both components SrO and CaO in a large amount, since they substantially equally increase the basicity of the glass composition without accompanying increase of the density or the linear expansion coefficient, (3) MgO is preferably incorporated, since it decreases the linear expansion coefficient and improves the devitrification properties, (4) if $Al_2O_3$ is incorporated in excess, the devitrification properties and BHF resistance deteriorate, (5) if $B_2O_3$ is incorporated in excess, the acid resistance deteriorates and the strain point and the Young's modulus decrease, and it is preferred not to incorporate $B_2O_3$ in excess also from the viewpoint that $B_2O_3$ is specified as an injurious material, (6) if $SiO_2$ is incorporated in excess, it decreases the basicity of the glass composition and the Young's modulus.

The present invention has been accomplished by the present inventors on the basis of the above discoveries. Namely, the present invention provides an alkali-free glass consisting essentially of, as represented by mol %:

| | |
|---|---|
| $SiO_2$ | at least 60% and less than 66%, |
| $Al_2O_3$ | 0 to 12%, |
| $B_2O_3$ | 5 to 10%, |
| MgO | 0 to 18%, |
| CaO | 0 to 18%, |
| SrO | 0 to 18%, |
| BaO | 0 to 6%, |
| CaO + SrO | 10 to 25%, |
| MgO + CaO + SrO + BaO | 15.5 to 30% | and containing substantially no alkali metal oxide.

It is preferred that the alkali-free glass of the present invention contains BaO in an amount of from 0 to 2% as represented by mol %.

It is preferred that the alkali-free glass of the present invention further contains at least one oxidizing additive selected from the group consisting of $CeO_2$, $SnO_2$, $ZrO_2$, $Fe_2O_3$, $TiO_2$, $MnO_2$, $Mg(NO_3)_2$, $Ca(NO_3)_2$, $Sr(NO_3)_2$, $Ba(NO_3)_2$, $MgSO_4$, $CaSO_4$, $SrSO_4$ and $BaSO_4$, in an appropriate amount.

It is preferred that the alkali-free glass of the present invention further contains from 0 to 4 wt % of F, from 0 to 4 wt % of Cl, from 0 to 4 wt % of $SO_3$, from 0 to 4 wt % of $SnO_2$, from 0 to 4 wt % of $TiO_2$, from 0 to 4 wt % of $CeO_2$, from 0 to 4 wt % of $ZrO_2$, from 0 to 2 wt % of $Fe_2O_3$, and from 1 ppm to 15 wt % of $F+Cl+SO_3+SnO_2+TiO_2+CeO_2+ZrO_2+Fe_2O_3$.

Further, the alkali-free glass of the present invention may contain from 0 to 4 wt % of $MnO_2$, and in such a case, $F+Cl+SO_3+SnO_2+TiO_2+MnO_2+CeO_2+ZrO_2+Fe_2O_3$ is preferably incorporated in an amount of from 1 pm to 15 wt %.

It is preferred that the alkali-free glass of the present invention contains substantially no $P_2O_5$, PbO, $As_2O_3$, $Sb_2O_3$ or ZnO.

Further, the present invention provides a process for producing an alkali-free glass, which comprises mixing glass components so that the desired composition consists essentially of, as represented by mol %:

| | |
|---|---|
| $SiO_2$ | at least 60% and less than 66%, |
| $Al_2O_3$ | 0 to 12%, |
| $B_2O_3$ | 5 to 10%, |
| MgO | 0 to 18%, |
| CaO | 0 to 18%, |
| SrO | 0 to 18%, |
| BaO | 0 to 6%, |
| CaO + SrO | 10 to 25%, |
| MgO + CaO + SrO + BaO | 15.5 to 30% | and contains substantially no alkali metal oxide, and heating and melting the mixed glass components within temperature range of from 1,500° C. to 1,660° C., and forming the molten glass by a float process.

It is preferred that, in the process for producing alkali-free glass of the present invention, at the time of melting the glass components, from 0 to 4 wt % of F, from 0 to 4 wt % of Cl, from 0 to 4 wt % of $SO_3$, from 0 to 4 wt % of $SnO_2$, from 0 to 4 wt % of $TiO_2$, from 0 to 4 wt % of $CeO_2$, from 0 to 4 wt % of $ZrO_2$, and from 0 to 2 wt % of $Fe_2O_3$, are further added so that $F+Cl+SO_3+SnO_2+TiO_2+CeO_2+ZrO_2+Fe_2O_3$ will be from 1 ppm to 15 wt %.

EFFECT OF THE INVENTION

The alkali-free glass of the present invention is excellent in the reducing resistance and is thus suitable for formation by a float process, and can solve various problems such as deterioration of the devitrification properties or the BHF resistance, and the amber coloration, which are caused by a reducing effect on a glass surface at the time of formation by a float process.

The alkali-free glass of the present invention is excellent in the melting property of glass, whereby it is possible to lower the temperature at which the glass is exposed to a reducing atmosphere at the time of forming by a float process. Increase of the absolute temperature in a reducing atmosphere, by itself, causes a strong reducing effect. Accordingly, the alkali-free glass can further improve its reducing resistance by lowering the temperature for exposure to a reducing atmosphere at the time of forming by a float process.

The alkali-free glass of the present invention excellent in the reducing resistance, can reduce diffusion of tin into the glass at the time of forming by a float process. Thus, during the production of display devices such as liquid crystal display devices, the amount of tin eluted to the etchant is reduced.

Further, the glass of the present invention is also expected to have improvements in the polishing rate (polishing property), the recycling property (e.g. removal of an attachment such as a sealing compound), the refining property (clearifer solubility) and wettability of glass (formability of glass on tin).

Further, the alkali-free glass of the present invention has a small density, a high strain point, a small average linear expansion coefficient and a high Young's modulus. Therefore, such an alkali-free glass is suitable for applications to e.g. a substrate for display devices including liquid crystal display devices and a photomask substrate where such properties are required.

The alkali-free glass of the present invention containing at least one oxidizing additive selected from the group consisting of $CeO_2$, $SnO_2$, $ZrO_2$, $Fe_2O_3$, $TiO_2$, $MnO_2$, $Mg(NO_3)_2$, $Ca(NO_3)_2$, $Sr(NO_3)_2$, $Ba(NO_3)_2$, $MgSO_4$, $CaSO_4$, $SrSO_4$ and $BaSO_4$ in an appropriate amount is better in the reducing resistance of glass.

The alkali-free glass of the present invention containing, as a refining agent, F, Cl, $SO_3$, $SnO_2$, $TiO_2$, $MnO_2$, $CeO_2$, $ZrO_2$ or $Fe_2O_3$ in a prescribed amount, is particularly excellent in the solubility, the refining property and the formability of glass.

The glass of the present invention containing substantially no $P_2O_5$, PbO, $As_2O_3$, $Sb_2O_3$ and ZnO, is environmentally preferred, and is suitable for recycling the glass.

The liquid crystal display panel of the present invention has excellent properties as a liquid crystal display, since it employs, as a glass substrate, the glass of the present invention having excellent properties for a substrate for display devices. Specifically, the glass substrate is light in weight and thus the liquid crystal display is light in weight, and the heat shrinkage of the glass substrate is small and thus it is possible to further make highly minute a TFT type liquid crystal display. Further, such a small heat shrinkage contributes also to an improvement of productivity of the liquid crystal display. Further, the alkali-free glass of the present invention, has excellent melting property and formability of the glass, and thus is free from waving (irregularities on the glass substrate) and excellent in flatness, whereby no partial uneven coloring occurs to an STN type liquid crystal display, and further, the Young's modulus of the glass substrate is high, whereby deflection is small, the display can be large-sized, and the handling will be efficient.

The process for producing the alkali-free glass of is the present invention can solve various problems at the time of forming glass by a float process, and thus is suitable for producing a glass substrate for display devices, particularly a glass substrate for liquid crystal display panels.

The procedure of mixing glass components to have a specific ratio and then heating and melting such mixed glass components at a temperature range of from 1,500 to 1,660° C., in the process for producing the alkali-free glass of the present invention, can be applied also in a production process other than a float process, e.g. to a case where such a melted glass is exposed to a strong reducing atmosphere during melting it, a case where a glass ribbon is heated partially at a high temperature by a gas burner or an electric heater during forming the glass, and a case where it is desired to prevent metallization of an Fe oxide or an impurity transition metal oxide.

BEST MODE FOR CARRYING OUT THE INVENTION

The alkali-free glass of the present invention (hereinafter referred to as "the glass of the present invention") contains substantially no alkali metal oxide.

Further, in this specification, the "content" means not the content of each component in the starting material, but the content of each component in the glass produced.

In the glass of the present invention, $SiO_2$ is a network former and essential. Since $SiO_2$ has a large effect of lowering the density of glass, it is preferred that the content of $SiO_2$ is large. However, if the content of $SiO_2$ is too large (at least 66 mol %), in a case where the glass has a specific composition, specifically, a composition which satisfies at least one of the following (1) to (3), the devitrification property tends to be poor, such being undesirable.

(1) A case where the total content of alkaline earth metal oxides (RO) (MgO+CaO+SrO+BaO) is large in the composition (RO is at least 25 mol %).

(2) A case where the total content of CaO and SrO (CaO+SrO) is large in the composition (CaO+SrO is at least 20 mol %).

(3) A case where the temperature ($T_2$) at which the viscosity becomes log $\eta=2$ is low in the composition ($T_2$ is at most 1,660° C.).

In the glass of the present invention, the content of $SiO_2$ is less than 66 mol %. The content of $SiO_2$ is preferably at most 65.5 mol %, more preferably at most 65 mol %, further preferably at most 64.5 mol %, furthermore preferably at most 64 mol %. If the content of $SiO_2$ is too small, the acid resistance deteriorates, the density increases, the strain point decreases, the linear expansion coefficient increases and the Young's modulus decreases, such being undesirable. In the glass of the present invention, the content of $SiO_2$ is at least 60 mol %, preferably at least 61 mol %, more preferably at least 62 mol %.

In the glass of the present invention, $Al_2O_3$ is incorporated to suppress the phase separation of the glass, to increase the strain point, and to increase the Young's modulus. If no phase separation occurs to the glass, it is not necessary to incorporate it, but in order to suppress the phase separation, $Al_2O_3$ is preferably incorporated in an amount of at least 3 mol %. The content of $Al_2O_3$ is more preferably at least 5 mol %, further preferably at least 6 mol %, furthermore preferably at least 7 mol %, furthermore preferably at least 8 mol %, furthermore preferably at least 9 mol %. However, if its content is too high, the devitrification property, the hydrochloric acid resistance and the BHF resistance deteriorate, such being undesirable. The glass of the present invention contains $Al_2O_3$ in an amount of at most 12 mol %. The content of $Al_2O_3$ is more preferably at most 11.5 mol %, further preferably at most 11 mol %.

In the glass of the present invention, $B_2O_3$ reduces the density, improves the BHF resistance, improves the melt reactivity of the glass, improves the devitrification property, and reduces the linear expansion coefficient, and thus is essential. In the glass of the present invention, the content of $B_2O_3$ is at least 5 mol %, preferably at least 7 mol %. It is more preferably at least 7.5 mol %, further preferably at least 8 mol %. However, if the content of $B_2O_3$ is too large, the strain point decreases, the Young's modulus lowers, and the acid resistance decreases, such being undesirable.

In the glass of the present invention, the content of $B_2O_3$ is at most 10 mol %, more preferably at most 9.5 mol %, further preferably at most 9 mol %.

In the glass of the present invention, MgO is preferably incorporated since among alkaline earth metals, MgO has characteristics such that it lowers the density, does not increase the linear expansion coefficient, and does not excessively decrease the strain point, and further it improves the melting property. In the glass of the present invention, the content of MgO is preferably at least 1 mol %, more preferably at least 2 mol %, further preferably at least 3 mol %, furthermore preferably 4 mol %, furthermore preferably at least 5 mol %, furthermore preferably at least 6 mol %, furthermore preferably at least 7 mol %. However, if the content of MgO is too large, the glass tends to undergo phase separation, or the devitrification property, the acid resistance and the BHF resistance tend to deteriorate, such being undesirable. In the glass of the present invention, the content of MgO is at most 18 mol %, more preferably at most 15 mol %, further preferably at most 13 mol %, furthermore preferably at most 11 mol %, furthermore preferably at most 10 mol %, furthermore preferably at most 9 mol %.

In the glass of the present invention, CaO may be incorporated, since among alkaline earth metals, CaO has characteristics such that it does not increase the density, does not increase the linear expansion coefficient, and does not excessively increase the strain point, and further it also improves the melting property, and does not necessarily seriously adversely affect the acid resistance or the durability against a resist-removing alkaline liquid.

However, if the content of CaO is too large, the devitrification property deteriorates, the linear expansion coefficient increases, the density increases, and the acid resistance and the durability against a resist-removing alkaline liquid decrease, such being undesirable. In the glass of the present invention, the content of CaO is at most 18 mol %, preferably at most 16 mol %, more preferably at most 14 mol %, further preferably at most 12 mol %, furthermore preferably at most 10 mol %.

In the glass of the present invention, SrO, like CaO, is preferably incorporated to improve the devitrification property and the acid resistance, since it has characteristics such that it does not increase the density, does not increase the linear expansion coefficient, does not excessively decrease the strain point, as compared with BaO, and it improves the melting property, and does not necessarily seriously adversely affect the acid resistance or the durability against a resist-removing alkaline liquid. In the glass of the present invention, the content of SrO is preferably at least 0.1 mol %, more preferably at least 0.2 mol %, further preferably at least 0.5 mol %, furthermore preferably at least 1 mol %, furthermore preferably at least 2 mol %, furthermore preferably at least 3 mol %, particularly preferably at least 4 mol %. Especially, in a case where the alkali-free glass contains BaO, SrO has an effect to overcome the after-mentioned problems, and therefore the content of SrO is preferably at least 2 mol %. However, if the content of SrO is too large, the devitrification property deteriorates, the linear expansion coefficient decreases, the density decreases, the acid resistance and the durability against a basic resist-removing liquid decreases, such being undesirable. In the glass of the present invention, the content of SrO is at most 18 mol %, preferably at most 16 mol %, more preferably at most 14 mol %, further preferably at most 12 mol %.

As mentioned above, an alkaline earth metal oxide increases the basicity of the glass composition and contributes to improve the reducing resistance of the glass, but in a case where glass has a composition having a high basicity, an adverse effect is likely to be brought about on the properties required for a substrate for displays. Thus, the glass of the present invention is characterized in that, among the alkaline earth metals, the content of CaO and SrO is increased to increase the basicity of the glass composition.

In the glass of the present invention, the content of $SiO_2$ is less than 66 mol %, and therefore, the total content of CaO and SrO(CaO+SrO) is at least 10 mol %, preferably at least 10.5 mol % to improve the devitrification properties, the acid resistance and the durability against a resist-removing alkaline liquid. CaO+SrO is more preferably at least 11 mol %, more preferably at least 12 mol %. For the same reason, CaO+SrO is at most 25 mol %, more preferably at most 23 mol %, further preferably at most 21 mol %, furthermore preferably at most 19 mol %, furthermore preferably at most 17 mol %, furthermore preferably at most 16 mol %.

Further, the present inventors have found that when CaO+SrO is within the above range, the Young's modulus and the electrical resistance of the glass, and adhesion of a scratch inhibitor to be used at the time of producing glass, are improved. In the production of the glass, a scratch inhibitor is used in order to prevent scratching by the contact of the glass with a carrier roller. In the glass of the present invention, adhesion of the scratch inhibitor to the glass surface is improved.

In the glass of the present invention, it is preferred that BaO is not incorporated so much, since it increases the density of the glass, lowers the Young's modulus and the melting property, and it deteriorates the BHF resistance. However, BaO may be incorporated in an appropriate amount, since it is effective to improve phase separation and devitrification property of glass and to improve the chemical durability. In the glass of the present invention, the content of BaO is at most 6 mol %. In order to reduce the density or the heat expansion coefficient, the content of BaO is more preferably at most 2 mol %, further preferably at most 1 mol %, furthermore preferably at most 0.5 mol %, and it is particularly preferred that substantially no BaO is incorporated except impurities in industrial materials, i.e. it is not intentionally incorporated.

As mentioned above, in the glass of the present invention, CaO+SrO is within the above range, the total content of the alkaline earth metal oxides (RO), namely, MgO+CaO+SrO+BaO necessarily becomes large. Further, if RO is small, the viscosity of the glass tends to be high, whereby the solubility deteriorates. In the glass of the present invention, MgO+CaO+SrO+BaO is at least 15.5 mol %. If MgO+CaO+SrO+BaO is less than 15.5 mol %, the temperature ($T_2$) at which the viscosity would be log η=2 exceeds 1,660° C., whereby the melting property of the glass deteriorates. MgO+CaO+SrO+BaO is more preferably at least 16 mol %, further preferably at least 16.5 mol %, furthermore preferably at least 17 mol %. However, if MgO+CaO+SrO+BaO is too large, the density and the linear expansion coefficient increase. In the glass of the present invention, MgO+CaO+SrO+BaO is at most 30 mol %, more preferably at most 28 mol %, further preferably at most 26 mol %, furthermore preferably at most 25 mol %.

It is preferred that the glass of the present invention contains at least one oxidizing additive selected from the group consisting of $CeO_2$, $SnO_2$, $ZrO_2$, $Fe_2O_3$, $TiO_2$, $MnO_2$, $Mg(NO_3)_2$, $Ca(NO_3)_2$, $Sr(NO_3)_2$, $Ba(NO_3)_2$, $MgSO_4$, $CaSO_4$, $SrSO_4$ and $BaSO_4$ in an appropriate amount. Such an oxidizing additive has a function to enhance the reducing resistance of glass by the oxidation. Accordingly, the alkali-free glass of the present invention containing such oxidizing additives is more remarkable in the reducing resistance of glass.

The present inventors have found that the glass composition having a high basicity has an effect to enhance the refining effect of a refining agent in addition to an effect to improve the reducing resistance of glass. For example, in a case of a sulfate (such as $SO_3$), it is dissolved in a form of $SO_4^{2-}$ in glass, but as the temperature increases, it generates $SO_2$ gas and $O_2$ gas as shown by the following formula to provide a degassing effect:

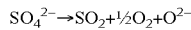

$$SO_4^{2-} \rightarrow SO_2 + \tfrac{1}{2}O_2 + O^{2-}$$

Glass having a high basicity has a high activity of $O^{2-}$, whereby the above reaction proceeds to the right in a state of high temperature (1,000 to 1,660° C.) at the time of melting the glass, and as a result, the degassing effect is obtained. The same effect is obtainable also with other refining agents such as F, Cl, $SnO_2$, $TiO_2$, $MnO_2$, $CeO_2$, $ZrO_2$, $Fe_2O_3$ and $Nb_2O_5$.

Accordingly, in order to improve the melting property, the refining property and the formability of glass of the present invention, it is preferred to add F, Cl, $SO_3$, $SnO_2$, $TiO_2$, $MnO_2$, $CeO_2$, $ZrO_2$, $Fe_2O_3$ or $Nb_2O_5$, particularly preferably F, Cl, $SO_3$, $SnO_2$, $TiO_2$, $MnO_2$, $CeO_2$, $ZrO_2$ or $Fe_2O_3$, as a refining agent, to the glass of the present invention, in addition to the above components.

They may be added alone, or two or more of them may be used in combination. When they are added, F is added in an amount of from 0 to 4 wt %, Cl in an amount of from 0 to 4 wt %, $SO_3$ in an amount of from 0 to 4 wt %, $SnO_2$ in an amount of from 0 to 4 wt %, $TiO_2$ in an amount of from 0 to 4 wt %, $MnO_2$ in an amount of from 0 to 4 wt %, $CeO_2$ in an amount of from 0 to 4 wt %, $ZrO_2$ in an amount of from 0 to 4 wt %, and $Fe_2O_3$ in an amount of from 0 to 2 wt %. The above wt % represents a mass % based on the mass of glass after formation. However, there are problems such as formation of bubbles, deterioration of the devitrification property and the coloration, and therefore the total content of such refining agents is at most 15 wt %.

Further, in order to obtain the desired effects by their addition, such components are added in an amount of preferably at least 1 ppm, more preferably at least 10 ppm, further preferably at least 100 ppm, furthermore preferably at least 0.1 wt %.

Specifically, $F+Cl+SO_3+SnO_2+TiO_2+CeO_2+ZrO_2+Fe_2O_3$ is preferably from 1 ppm to 15 wt %, and further $F+Cl+SO_3+SnO_2+TiO_2+MnO_2+CeO_2+ZrO_2+Fe_2O_3$ is particularly preferably from 1 ppm to 15 wt %.

The glass of the present invention has a composition having a high basicity, and therefore, it is expected that the refining effect of the refining agent to be added is increased and the yield in the production of the substrate is improved.

Further, it is preferred that $P_2O_5$, PbO, $As_2O_3$, $Sb_2O_3$ and ZnO are not substantially incorporated from the viewpoint of their influence to the environment. Here, "not substantially incorporated" means that the above components are not incorporated except inevitable impurities in the industrial material, and such a content is for example at most 0.1 mol %.

It is preferred not to substantially contain such substances also from the viewpoint of recycling glass.

The glass of the present invention preferably has a linear expansion coefficient of at most $52 \times 10^{-7}/° C.$ at 50 to 350° C.

If the linear expansion coefficient is at most $52 \times 10^{-7}/° C.$, the thermal shock resistance will be excellent. The linear expansion coefficient is more preferably at most $50 \times 10^{-7}/° C.$, further preferably at most $48 \times 10^{-7}/° C.$, particularly preferably at most $45 \times 10^{-7}/° C.$ Further, the linear expansion coefficient is preferably at least $32 \times 10^{-7}/° C.$, and if it is at least $32 \times 10^{-7}/° C.$, in a case where a $SiO_x$ or $SiN_x$ film is formed on such a glass substrate, matching in expansion will be excellent between such a glass substrate and such a film. From such a viewpoint, the above linear expansion coefficient is more preferably at least $35 \times 10^{-7}/° C.$, further preferably at least $38 \times 10^{-7}/° C.$, furthermore preferably at least $39 \times 10^{-7}/° C.$, furthermore preferably at least $40 \times 10^{-7}/° C.$ The glass of the present invention preferably has a Young's modulus of at least 74 GPa. If the Young's modulus is at least 74 GPa, the deflection will be small, whereby a display may be made large-sized, and further handling efficiency of glass will be excellent. The Young's modulus is more preferably at least 76 GPa, further preferably at least 79 GPa.

The glass of the present invention preferably has a density of at most 2.85 g/cc, particularly preferably at most 2.80 g/cc. If the density of glass is at most 2.85 g/cc, a display can suitably be made light in weight. The density is more preferably at most 2.75 g/cc, further preferably at most 2.70 g/cc, particularly preferably at most 2.65 g/cc.

The glass of the present invention preferably has a strain point of at least 600° C. If the strain point is at least 600° C., the glass is excellent in that it has a small thermal shrinkage. The strain point is more preferably at least 630° C., further preferably at least 640° C. Further, as an index of the strain point, a glass transition point can be used. Within the range of the glass composition of the present invention, the glass transition point is higher by approximately 50° C. than the temperature of the strain point. Accordingly, the glass of the present invention preferably has a glass transition point of at least 650° C., more preferably 670° C., further preferably at least 680° C., furthermore preferably at least 690° C.

The glass of the present invention preferably has a temperature $T_2$, at which the viscosity becomes log $\eta=2$, of at most 1,660° C. $T_2$ is a temperature as an index of the melting property of the glass, and $T_2$ is preferably at most 1,660° C. for melting the glass. $T_2$ is more preferably at most 1,600° C., further preferably at most 1,580° C., furthermore preferably at most 1,560° C., particularly preferably at most 1,550° C.

The glass of the present invention preferably has a temperature $T_4$, at which the viscosity becomes log $\eta=4$, of at most 1,280° C. $T_4$ is a temperature as an index of the float formability, and $T_4$ is preferably at most 1,280° C. for forming the glass by a float process. $T_4$ is more preferably at most 1,250° C., further preferably at most 1,230° C., furthermore preferably at most 1,210° C., particularly preferably at most 1,200° C.

The glass of the present invention may be produced by, for example, the following method.

Starting materials commonly used for the respective components, are mixed to have the desired composition, and the mixture is put into a melting furnace continuously, and heated and melted with a temperature range of from 1,500 to 1,660° C., preferably from 1,500 to 1,600° C. Such molten glass is formed into a prescribed thickness by a float process, and then annealed and cut into a desired size, followed by processing such as grinding or polishing to produce the glass of the present invention. The glass of the present invention is excellent in the reducing resistance, and therefore, in a float process where glass is exposed in a reducing atmosphere at the time of forming, such an effect is particularly effective, but other known methods may be used for formation of the glass.

Specifically, such other methods may, for example, be a well known press method, a down draw method and a fusion method. The glass of the present invention, is particularly suitable for a thin and large size glass substrate (for example, the thickness is from 0.5 to 1.5 mm, and the size is at least 1,700×1,400 mm).

Further, the present invention provides a liquid crystal display panel using the glass of the present invention as a glass substrate. For example, in a case where the liquid crystal display panel is a thin film transistor liquid crystal display (TFT-LCD), it has an electrode substrate for a display (an array substrate) having a gate electrode line and an oxide layer for gate insulation formed thereon and further having a pixel electrode formed on the surface of the oxide layer, and a color filter substrate having an RGB color filter and a counter electrode formed thereon. And in between a pair of the array substrate and the color filter substrate, a liquid crystal material is interposed to constitute a cell. In addition to such a cell, the liquid crystal display panel contains other elements such as peripheral circuits. In the liquid crystal display panel of the present invention, the glass of the present invention is used for at least one of the pair of the substrates constituting the cell.

EXAMPLES

In Tables 1 to 6, compositions of the glasses in Examples (Examples 1 to 51) and Comparative Examples (Examples 52 and 53) are shown by mol %.

Starting materials of the respective components were mixed so that glasses after the formation have compositions shown in Tables 1 to 6, and melted at a temperature of from 1,500 to 1,660° C. by means of a platinum crucible. At the time of melting, stirring was carried out by means of a platinum stirrer to homogenize the glass. Then, the molten glass was cast, as it was, to form a plate having a desired thickness, and then annealed to obtain the glass in each of Examples and Comparative Examples.

Further, to the glass in each of Examples and Comparative Examples, during melting the glass, as refining agent components, F was added in an amount of from 0 to 0.5 wt %, Cl from 0 to 1.5 wt %, and $SO_3$ from 0 to 2.0 wt %, under a condition that the total content was from 1 ppm to 15 wt %. Here, the amount of 0 wt % represents no addition. For example, in each of Examples 27 and 52, as refining agents, F was added in an amount of 0.1 wt %, Cl 1 wt %, and $SO_3$ 1 wt %. The above wt % represents a mass % based on the mass of the glass after the formation.

Tables 1 to 6 show, as properties of the glasses obtained, the density (g/cc), the linear expansion coefficient at from 50° C. to 350° C. (the average linear expansion coefficient, ($\times 10^{-7}$/° C.)), the glass transition point Tg (° C.) as an index of a high temperature density, the temperature $T_2$ (° C.) at which log η=2 (poise) as an index of the melting property and the temperature $T_4$ (° C.) at which log η=4 (poise) as an index of the float formability, the devitrification property, the Young's modulus (GPa), $\Delta W_{HCl}$ as an index of the HCl resistance, and the number of bubbles (number/$cm^3$) as an index of the refining property. Here, the density, the linear expansion coefficient, the strain point, $T_2$, $T_4$, the Young's modulus and $\Delta W_{HCl}$ include measured values and calculated values.

The respective items shown in Tables 1 to 6 were measured or calculated by the following procedures.

Density

The density (measured value) was measured by using a simple densitometer based on an Archimedes method.

With regard to the density (calculated value), the contribution degree $a_i$ (i=1 to 7 (each glass component (each of seven components of $SiO_2$, $Al_2O_3$, $B_2O_3$, MgO, CaO, SrO, BaO))), is obtained by a regression calculation, and it is obtained by calculation from $\Sigma a_i X_i + b$ ($X_i$ is the mol fraction of each glass component, and b is a constant).

Linear Expansion Coefficient, Glass Transition Point (Tg)

The average linear expansion coefficient (measured value) at from 50° C. to 350° C. and the glass transition point (Tg) were measured by using a differential thermal dilatometer (TMA).

The average linear expansion coefficient (calculated value) at from 50° C. to 350° C. is obtained by calculation from the contribution degree of each glass component, in the same manner as in the density (calculated value).

Strain Point

The strain point (measured value) was measured by the method stipulated in JIS R3103.

The strain point (calculated values) is obtained by calculation from the contribution degree of each glass component in the same manner as in the density (calculated value).

$T_2$, $T_4$ $T_2$ and $T_4$ (measured values) were measured by means of a rotational viscometer.

$T_2$ and $T_4$ (calculated values) are obtained by calculation from the contribution degree of each glass component, in the same manner as in the density (calculated value).

Devitrification Temperature, Devitrification Property

With respect to the devitrification temperature, a plurality of glass pieces were melted under heating for 17 hours at the respectively different temperatures, and an average value between the glass temperature of glass having the highest temperature among glasses having crystals precipitated therein, and the glass temperature of glass having the lowest temperature among glasses having no crystals precipitated, was taken as the devitrification temperature.

With respect to the devitrification property, heat treatment was carried out for 17 hours (atmospheric condition) under temperature conditions of $T_4$, $T_4+20°$ C. and $T_4+30°$ C., and the results were evaluated based on the following standards.

A: A case where no crystals were formed when heat treatment was carried out at a temperature $T_4$.

B: A case where no crystals were formed when heat treatment was carried out at a temperature $T_4+20°$ C. (one having a devitrification temperature within $T_4+20°$ C.).

C: A case where no crystals were formed when heat treatment was carried out at a temperature $T_4+30°$ C. (one having a devitrification temperature within $T_4+30°$ C.).

Young'S Modulus

The Young's modulus (measured value) was measured by the ultrasonic pulse method (JIS R1602).

The Young's modulus (calculated value) is obtained by calculation from the contribution degree of each glass component, in the same manner as for the density (calculated value).

HCl Resistance ($\Delta W_{HCl}$)

The HCl resistance was evaluated as a weight loss ($\Delta W_{HCl}$) per unit surface area of glass.

The above glass obtained in each of Examples and Comparative Examples as mentioned above, was immersed at 90° C. for 20 hours in an aqueous hydrochloric acid solution having a concentration of 0.1 mol/liter, whereby the mass change of the glass between before and after the immersion was obtained, and from such a mass change and the surface area of the glass, $\Delta W_{HCl}$ (measured value) was obtained.

$\Delta W_{HCl}$ (calculated value) is obtained by calculation from the contribution degree of each glass component, in the same manner as for the density (calculated value).

Number of Bubbles

As an index of refining property, the number of bubbles after the above glass obtained in each of Examples and Comparative Examples was melted at 1,580° C. for 30 minutes, was measured by means of a microscope.

In Tables 7 and 8, the compositions of the glasses obtained in Examples 1 to 20 are shown by mass %. Further, in Tables 7 and 8, "mol %" in each of Tables 1 and 2 is converted to mass % directly by calculation, and two places of decimals are rounded off, and therefore there are cases where the total of the composition is not 100%.

As shown in Tables 1 to 6, the glasses in Examples have a density of at most 2.85 g/cc, a linear expansion coefficient of at most $52 \times 10^{-7}/°$ C. and a glass transition point of at least 650° C., and thus, it has been confirmed that they are excellent in the properties for a glass substrate for a display. Further, the glasses in Examples have $T_2$ of at most 1,660° C. as an index for the melting property of glass, and thus it has been confirmed that they are excellent in the melting property of glass. Further, the glasses in Examples have $T_4$ of at most 1,280° C., and thus, it has been confirmed that they are alkali-free glasses suitable for forming glass by a float process.

The glasses in Examples 17, 31, 35 and 51 have a low $\Delta W_{HCl}$ (measured value), and thus represent examples of a preferred composition excellent in the hydrochloric acid resistance. Among them, the glasses in Examples 31, 35 and 51 are more preferred, since they have a low $T_2$ as an index of the melting property of glass and thus are excellent also in the melting property of glass.

When the glass in Example 31 and the glass in Example 37 are compared, it has been confirmed that with the glass in Example 37 having BaO added thereto, the devitrification temperature was improved from 1,174° C. (Example 31) to 1,163° C. (Example 37).

When the glass in Example 27 and the glass in Example 52 (Comparative Example), having the above refining agent added thereto, are compared, the glass in Example 52 has a total content of an alkaline earth metal oxide (RO) of less than 15.5 mol % and CaO+SrO of less than 10 mol %, and therefore the basicity of the glass composition is low, and the effect of the refining agent decreases. With regard to this point, the number of bubbles after melting for 30 minutes at 1,580° C., was 200 number/cm³ in the glass in Example 52, and 30 number/cm³ in the glass in Example 27, whereby it has been confirmed that the number of bubbles in the glass in Example 27 is less than that in the glass in Example 52 in spite that the same amount of the refining agent was added. Further, when the glasses in Examples 31 and 51 are compared with the glass in Example 53 (Comparative Example), the glass in Example 53 has a CaO+SrO content of less than 10 mol %, whereby the basicity of the glass composition is low, and the effect of the refining agent decreases. While the number of bubbles is 170 number/cm³ in the glass in Example 53, the number of bubbles is 30 number/cm³ in the glass in each of Examples 31 and 51. Thus, it has been confirmed that the number of bubbles in each of Examples 31 and 51 was lower than that of the glass in Example 53. Further, the glass in Example 53 has a BaO content of more than 6 mol %, and it has been confirmed that the Young's modulus lowered to 73 GPa.

The glass in Example 31 can be formed into a thickness of 0.7 mm by a float process, followed by processing such as cutting to obtain a glass substrate having a size of 2,400×2,200 mm.

TABLE 1

| | | Ex. 1 mol % | Ex. 2 mol % | Ex. 3 mol % | Ex. 4 mol % | Ex. 5 mol % | Ex. 6 mol % | Ex. 7 mol % | Ex. 8 mol % | Ex. 9 mol % | Ex. 10 mol % |
|---|---|---|---|---|---|---|---|---|---|---|---|
| | $SiO_2$ | 60 | 60 | 60 | 60 | 60 | 60 | 60 | 60 | 62 | 62 |
| | $Al_2O_3$ | 11 | 11 | 11 | 11 | 9 | 9 | 9 | 9 | 9 | 9 |
| | $B_2O_3$ | 8 | 8 | 8 | 8 | 8 | 8 | 8 | 8 | 8 | 8 |
| | MgO | 7 | 7 | 7 | 7 | 7 | 7 | 7 | 7 | 7 | 7 |
| | CaO | 0 | 7 | 10.5 | 14 | 0 | 8 | 12 | 16 | 0 | 7 |
| | SrO | 14 | 7 | 3.5 | 0 | 16 | 8 | 4 | 0 | 14 | 7 |
| | BaO | 0 | 0 | 0 | 0 | 0 | 0 | 0 | 0 | 0 | 0 |
| | CaO + SrO | 14 | 14 | 14 | 14 | 16 | 16 | 16 | 16 | 14 | 14 |
| | MgO + CaO + SrO + BaO | 21 | 21 | 21 | 21 | 23 | 23 | 23 | 23 | 21 | 21 |
| Measured value | Density (g/cc) | 2.72 | 2.61 | 2.55 | 2.50 | 2.78 | 2.65 | 2.58 | 2.52 | 2.71 | 2.60 |
| | Linear expansion coefficient ($\times 10^{-7}/°$ C., 50-350° C.) | 49 | 45 | 44 | 42 | 49 | 49 | 47 | 47 | 48 | 45 |
| | Glass transition point Tg (° C.) | 692 | 694 | 692 | 696 | 685 | 681 | 682 | 682 | 685 | 684 |
| | Strain point (° C.) | | | 651 | | | | | | | |
| | $T_2$ (° C.) | 1533 | 1529 | 1518 | 1510 | 1484 | | | | | |
| | $T_4$ (° C.) | 1169 | 1166 | 1162 | 1163 | 1129 | | | | | |
| | Devitrification temperature (° C.) | | | | | | | | | | |
| | Devitrification property | A | A | A | B | B | B | B | B | B | B |
| | Young's modulus (GPa) | | | 82 | | | | | | | |
| | $\Delta W_{HCl}$ (mg/cm²) | 0.62 | 0.50 | 0.56 | 0.52 | 0.32 | 0.32 | 0.47 | 1.14 | 0.21 | 0.22 |
| | Number of bubbles (number/cm³) | | | | | | | | | | |
| Calculated value | Density (g/cc) | | | | | | | | | | |
| | Linear expansion coefficient ($\times 10^{-7}/°$ C., 50-350° C.) | | | | | | | | | | |

TABLE 1-continued

|  | Ex. 1 mol % | Ex. 2 mol % | Ex. 3 mol % | Ex. 4 mol % | Ex. 5 mol % | Ex. 6 mol % | Ex. 7 mol % | Ex. 8 mol % | Ex. 9 mol % | Ex. 10 mol % |
|---|---|---|---|---|---|---|---|---|---|---|
| Strain point (° C.) | 630 | 640 |  | 650 | 616 | 628 | 634 | 640 | 625 | 635 |
| $T_2$ (° C.) | 1468 | 1519 | 1545 |  |  | 1460 | 1451 | 1442 | 1561 | 1545 |
| $T_4$ (° C.) | 1227 | 1179 | 1154 |  |  | 1126 | 1124 | 1122 | 1173 | 1169 |
| Young's modulus (GPa) |  |  |  |  |  |  |  |  |  |  |
| $\Delta W_{HCl}$ (mg/cm$^2$) |  |  |  |  |  |  |  |  |  |  |

TABLE 2

|  |  | Ex. 11 mol % | Ex. 12 mol % | Ex. 13 mol % | Ex. 14 mol % | Ex. 15 mol % | Ex. 16 mol % | Ex. 17 mol % | Ex. 18 mol % | Ex. 19 mol % | Ex. 20 mol % |
|---|---|---|---|---|---|---|---|---|---|---|---|
|  | $SiO_2$ | 62 | 62 | 62 | 62 | 62 | 62 | 64 | 64 | 64 | 64 |
|  | $Al_2O_3$ | 9 | 9 | 11 | 11 | 11 | 11 | 9 | 9 | 9 | 9 |
|  | $B_2O_3$ | 8 | 8 | 8 | 8 | 8 | 8 | 8 | 8 | 8 | 8 |
|  | MgO | 7 | 7 | 7 | 7 | 7 | 7 | 7 | 7 | 7 | 7 |
|  | CaO | 10.5 | 14 | 0 | 6 | 9 | 12 | 0 | 6 | 9 | 12 |
|  | SrO | 3.5 | 0 | 12 | 6 | 3 | 0 | 12 | 6 | 3 | 0 |
|  | BaO | 0 | 0 | 0 | 0 | 0 | 0 | 0 | 0 | 0 | 0 |
|  | CaO + SrO | 14 | 14 | 12 | 12 | 12 | 12 | 12 | 12 | 12 | 12 |
|  | MgO + CaO + SrO + BaO | 21 | 21 | 19 | 19 | 19 | 19 | 19 | 19 | 19 | 19 |
| Measured value | Density (g/cc) | 2.54 | 2.49 | 2.66 | 2.56 | 2.52 | 2.47 | 2.64 | 2.55 | 2.50 | 2.45 |
|  | Linear expansion coefficient (×10$^{-7}$/° C., 50-350° C.) | 44 | 43 | 42 | 41 | 40 | 39 | 45 | 43 | 40 | 41 |
|  | Glass transition point Tg (° C.) | 683 | 685 | 702 | 701 | 699 | 703 | 688 | 685 | 685 | 688 |
|  | Strain point (° C.) |  |  |  |  |  |  |  |  |  |  |
|  | $T_2$ (° C.) |  | 1524 |  |  |  |  |  |  |  |  |
|  | $T_4$ (° C.) |  | 1163 |  |  |  |  |  |  |  |  |
|  | Devitrification temperature (° C.) |  |  |  |  |  |  |  |  |  |  |
|  | Devitrification property | B | B | B | B | B | B | B | B | B | B |
|  | Young's modulus (GPa) |  |  |  |  |  |  |  |  |  |  |
|  | $\Delta W_{HCl}$ (mg/cm$^2$) | 0.31 | 0.65 | 0.29 | 0.28 | 0.31 | 0.33 | 0.16 | 0.30 | 0.51 | 1.07 |
|  | Number of bubbles (number/cm$^3$) |  |  |  |  |  |  |  |  |  |  |
| Calculated value | Density (g/cc) |  |  |  |  |  |  |  |  |  |  |
|  | Linear expansion coefficient (×10$^{-7}$/° C., 50-350° C.) |  |  |  |  |  |  |  |  |  |  |
|  | Strain point (° C.) | 640 | 645 | 638 | 647 | 651 | 656 | 633 | 642 | 646 | 650 |
|  | $T_2$ (° C.) | 1538 |  | 1621 | 1608 | 1601 | 1594 | 1644 | 1631 | 1624 | 1618 |
|  | $T_4$ (° C.) | 1168 |  | 1211 | 1208 | 1207 | 1205 | 1216 | 1213 | 1211 | 1210 |
|  | Young's modulus (GPa) |  |  |  |  |  |  |  |  |  |  |
|  | $\Delta W_{HCl}$ (mg/cm$^2$) |  |  |  |  |  |  |  |  |  |  |

TABLE 3

|  |  | Ex. 21 mol % | Ex. 22 mol % | Ex. 23 mol % | Ex. 24 mol % | Ex. 25 mol % | Ex. 26 mol % | Ex. 27 mol % | Ex. 28 mol % | Ex. 29 mol % | Ex. 30 mol % |
|---|---|---|---|---|---|---|---|---|---|---|---|
|  | $SiO_2$ | 65 | 64 | 65.5 | 62 | 62 | 62 | 63 | 63 | 63 | 64 |
|  | $Al_2O_3$ | 8 | 9 | 10 | 8 | 8 | 8 | 8 | 8 | 8 | 7 |
|  | $B_2O_3$ | 8 | 9 | 8.5 | 7 | 8 | 8 | 8 | 8 | 8 | 8 |
|  | MgO | 6 | 7 | 4 | 5 | 7 | 7 | 7 | 7 | 7 | 7 |
|  | CaO | 7 | 6 | 6 | 9 | 7.1 | 6.7 | 7 | 9 | 5 | 7 |
|  | SrO | 6 | 5 | 6 | 9 | 7.1 | 6.7 | 7 | 5 | 9 | 7 |
|  | BaO | 0 | 0 | 0 | 0 | 0.8 | 1.6 | 0 | 0 | 0 | 0 |
|  | CaO + SrO | 13 | 11 | 12 | 18 | 14.2 | 13.4 | 14 | 14 | 14 | 14 |
|  | MgO + CaO + SrO + BaO | 19 | 18 | 16 | 23 | 22 | 22 | 21 | 21 | 21 | 21 |
| Measured value | Density (g/cc) |  |  |  |  |  |  | 2.59 |  |  |  |
|  | Linear expansion coefficient (×10$^{-7}$/° C., 50-350° C.) |  |  |  |  |  |  | 47 |  |  |  |
|  | Glass transition point Tg (° C.) |  |  |  |  |  |  | 678 |  |  |  |

TABLE 3-continued

|  |  | Ex. 21 mol % | Ex. 22 mol % | Ex. 23 mol % | Ex. 24 mol % | Ex. 25 mol % | Ex. 26 mol % | Ex. 27 mol % | Ex. 28 mol % | Ex. 29 mol % | Ex. 30 mol % |
|---|---|---|---|---|---|---|---|---|---|---|---|
|  | Strain point (° C.) |  |  |  |  |  |  | 638 |  |  |  |
|  | $T_2$ (° C.) |  |  |  |  |  |  | 1575 |  |  |  |
|  | $T_4$ (° C.) |  |  |  |  |  |  | 1173 |  |  |  |
|  | Devitrification temperature (° C.) |  |  |  |  |  |  | 1187 |  |  |  |
|  | Devitrification property |  |  |  |  |  |  | B |  |  |  |
|  | Young's modulus (GPa) |  |  |  |  |  |  | 79 |  |  |  |
|  | $\Delta W_{HCl}$ (mg/cm$^2$) |  |  |  |  |  |  | 0.21 |  |  |  |
|  | Number of bubbles (number/cm$^3$) |  |  |  |  |  |  | 30 |  |  |  |
| Calculated value | Density (g/cc) | 2.55 | 2.52 | 2.53 | 2.66 | 2.63 | 2.65 |  | 2.57 | 2.61 | 2.58 |
|  | Linear expansion coefficient (×10$^{-7}$/° C., 50-350° C.) | 43 | 41 | 40 | 51 | 48 | 48 |  | 45 | 47 | 46 |
|  | Strain point (° C.) | 640 | 637 | 652 | 635 | 629 | 628 |  | 635 | 629 | 629 |
|  | $T_2$ (° C.) | 1623 | 1618 | 1653 | 1533 | 1543 | 1541 |  | 1553 | 1561 | 1568 |
|  | $T_4$ (° C.) | 1230 | 1212 | 1269 | 1201 | 1184 | 1186 |  | 1171 | 1173 | 1174 |
|  | Young's modulus (GPa) |  |  |  |  |  |  |  |  |  |  |
|  | $\Delta W_{HCl}$ (mg/cm$^2$) | 0.16 | 0.37 | 0.19 | 0.15 | 0.20 | 0.17 |  | 0.28 | 0.16 | 0.16 |

TABLE 4

|  |  | Ex. 31 mol % | Ex. 32 mol % | Ex. 33 mol % | Ex. 34 mol % | Ex. 35 mol % | Ex. 36 mol % | Ex. 37 mol % | Ex. 38 mol % | Ex. 39 mol % |
|---|---|---|---|---|---|---|---|---|---|---|
|  | $SiO_2$ | 62 | 62 | 62 | 62 | 62 | 61 | 62 | 62 | 62 |
|  | $Al_2O_3$ | 8 | 8 | 8 | 8 | 8 | 10 | 8 | 8 | 8 |
|  | $B_2O_3$ | 8 | 8 | 8 | 8 | 8 | 8 | 8 | 8 | 8 |
|  | MgO | 7 | 7 | 7 | 7 | 8 | 8 | 7 | 7 | 6.5 |
|  | CaO | 7.5 | 9 | 6 | 5 | 5 | 5 | 7 | 7 | 7.5 |
|  | SrO | 7.5 | 6 | 9 | 10 | 9 | 8 | 5 | 4 | 3 |
|  | BaO | 0 | 0 | 0 | 0 | 0 | 0 | 3 | 4 | 5 |
|  | CaO + SrO | 15 | 15 | 15 | 15 | 14 | 13 | 12 | 11 | 10.5 |
|  | MgO + CaO + SrO + BaO | 22 | 22 | 22 | 22 | 22 | 21 | 22 | 22 | 22 |
| Measured value | Density (g/cc) | 2.62 |  |  |  | 2.64 | 2.62 |  |  |  |
|  | Linear expansion coefficient (×10$^{-7}$/° C., 50-350° C.) | 46 |  |  |  | 46 | 43 |  |  |  |
|  | Glass transition point Tg (° C.) | 677 |  |  |  |  |  |  |  |  |
|  | Strain point (° C.) | 634 |  |  |  | 639 | 646 |  |  |  |
|  | $T_2$ (° C.) | 1523 |  |  |  | 1520 | 1532 |  |  |  |
|  | $T_4$ (° C.) | 1160 |  |  |  | 1156 | 1174 |  |  |  |
|  | Devitrification temperature (° C.) | 1174 |  |  |  | 1171 | 1200 | 1163 |  |  |
|  | Devitrification property | B |  |  |  | B | C | B |  |  |
|  | Young's modulus (GPa) | 79 |  |  |  | 81 | 81 |  |  |  |
|  | $\Delta W_{HCl}$ (mg/cm$^2$) | 0.20 |  |  |  | 0.20 | 0.40 |  |  |  |
|  | Number of bubbles (number/cm$^3$) | 30 |  |  |  |  |  |  |  |  |
| Calculated value | Density (g/cc) |  | 2.60 | 2.63 | 2.64 |  |  | 2.67 | 2.69 | 2.70 |
|  | Linear expansion coefficient (×10$^{-7}$/° C., 50-350° C.) |  | 47 | 48 | 48 |  |  | 49 | 49 | 50 |
|  | Strain point (° C.) |  | 631 | 627 | 625 |  |  | 625 | 623 | 621 |
|  | $T_2$ (° C.) |  | 1511 | 1517 | 1520 |  |  | 1516 | 1517 | 1516 |
|  | $T_4$ (° C.) |  | 1149 | 1151 | 1151 |  |  | 1151 | 1151 | 1150 |
|  | Young's modulus (GPa) |  |  |  |  |  |  | 78 | 77 | 77 |
|  | $\Delta W_{HCl}$ (mg/cm$^2$) |  | 0.30 | 0.20 | 0.17 |  |  | 0.31 | 0.35 | 0.36 |

TABLE 5

|  |  | Ex. 40 mol % | Ex. 41 mol % | Ex. 42 mol % | Ex. 43 mol % | Ex. 44 mol % | Ex. 45 mol % | Ex. 46 mol % | Ex. 47 mol % | Ex. 48 mol % |
| --- | --- | --- | --- | --- | --- | --- | --- | --- | --- | --- |
|  | $SiO_2$ | 62 | 62 | 62 | 62 | 62 | 61 | 61 | 61 | 61 |
|  | $Al_2O_3$ | 8 | 8 | 8 | 8 | 8 | 10 | 10 | 10 | 10 |
|  | $B_2O_3$ | 8 | 8 | 8 | 8 | 8 | 8 | 8 | 8 | 8 |
|  | MgO | 5.5 | 7 | 7 | 6.5 | 6 | 8 | 6.5 | 4.5 | 8 |
|  | CaO | 8.5 | 5 | 4 | 3 | 2 | 5 | 6.5 | 8.5 | 3 |
|  | SrO | 2 | 7 | 7 | 7.5 | 8 | 6 | 4 | 2 | 8 |
|  | BaO | 6 | 3 | 4 | 5 | 6 | 2 | 4 | 6 | 2 |
|  | CaO + SrO | 10.5 | 12 | 11 | 10.5 | 10 | 11 | 10.5 | 10.5 | 11 |
|  | MgO + CaO + SrO + BaO | 22 | 22 | 22 | 22 | 22 | 21 | 21 | 21 | 21 |
| Measured value | Density (g/cc) |  |  |  |  |  |  |  |  |  |
|  | Linear expansion coefficient ($\times 10^{-7}/°$ C., 50-350° C.) |  |  |  |  |  |  |  |  |  |
|  | Glass transition point Tg (° C.) |  |  |  |  |  |  |  |  |  |
|  | Strain point (° C.) |  |  |  |  |  |  |  |  |  |
|  | $T_2$ (° C.) |  |  |  |  |  |  |  |  |  |
|  | $T_4$ (° C.) |  |  |  |  |  |  |  |  |  |
|  | Devitrification temperature (° C.) |  |  |  |  |  |  |  |  |  |
|  | Devitrification property |  |  |  |  |  |  |  |  |  |
|  | Young's modulus (GPa) |  |  |  |  |  |  |  |  |  |
|  | $\Delta W_{HCl}$ (mg/cm$^2$) |  |  |  |  |  |  |  |  |  |
|  | Number of bubbles (number/cm$^3$) |  |  |  |  |  |  |  |  |  |
| Calculated value | Density (g/cc) | 2.73 | 2.70 | 2.73 | 2.78 | 2.80 | 2.65 | 2.69 | 2.73 | 2.68 |
|  | Linear expansion coefficient ($\times 10^{-7}/°$ C., 50-350° C.) | 51 | 49 | 50 | 51 | 52 | 46 | 47 | 50 | 46 |
|  | Strain point (° C.) | 618 | 623 | 620 | 616 | 613 | 639 | 633 | 628 | 636 |
|  | $T_2$ (° C.) | 1520 | 1534 | 1527 | 1524 | 1523 | 1518 | 1513 | 1511 | 1519 |
|  | $T_4$ (° C.) | 1130 | 1146 | 1145 | 1141 | 1147 | 1171 | 1158 | 1141 | 1172 |
|  | Young's modulus (GPa) | 76 | 77 | 76 | 76 | 75 | 79 | 78 | 77 | 79 |
|  | $\Delta W_{HCl}$ (mg/cm$^2$) | 0.35 | 0.27 | 0.29 | 0.27 | 0.20 | 0.55 | 0.54 | 0.50 | 0.48 |

TABLE 6

|  |  | Ex. 49 mol % | Ex. 50 mol % | Ex. 51 mol % | Ex. 52 mol % | Ex. 53 mol % |
| --- | --- | --- | --- | --- | --- | --- |
|  | $SiO_2$ | 61 | 61 | 62 | 66 | 67.5 |
|  | $Al_2O_3$ | 10 | 10 | 9 | 11.5 | 7.5 |
|  | $B_2O_3$ | 8 | 8 | 7 | 8 | 6 |
|  | MgO | 6.5 | 4.5 | 6.5 | 5 | 3.5 |
|  | CaO | 2.5 | 2.5 | 9 | 4.5 | 4 |
|  | SrO | 8 | 8 | 6.5 | 5 | 4.5 |
|  | BaO | 4 | 6 | 0 | 0 | 7 |
|  | CaO + SrO | 10.5 | 10.5 | 15.5 | 9.5 | 8.5 |
|  | MgO + CaO + SrO + BaO | 21 | 21 | 22 | 14.5 | 19 |
| Measured value | Density (g/cc) |  |  | 2.62 | 2.50 | 2.77 |
|  | Linear expansion coefficient ($\times 10^{-7}/°$ C., 50-350° C.) |  |  | 48 | 38 | 49 |
|  | Glass transition point Tg(° C.) |  |  | 694 | 716 |  |
|  | Strain point (° C.) |  |  |  | 660 | 635 |
|  | $T_2$ (° C.) |  |  | 1534 | 1669 | 1627 |
|  | $T_4$ (° C.) |  |  | 1164 | 1284 | 1212 |
|  | Devitrification temperature (° C.) |  |  | 1199 | 1270 |  |
|  | Devitrification property |  |  | B | A |  |
|  | Young's modulus (GPa) |  |  | 81 | 78 | 73 |
|  | $\Delta W_{HCl}$ (mg/cm$^2$) |  |  | 0.15 | 0.1 |  |
|  | Number of bubbles (number/cm$^3$) |  |  | 30 | 200 | 170 |

TABLE 6-continued

|  |  | Ex. 49 mol % | Ex. 50 mol % | Ex. 51 mol % | Ex. 52 mol % | Ex. 53 mol % |
|---|---|---|---|---|---|---|
| Calculated value | Density (g/cc) | 2.75 | 2.83 |  |  |  |
|  | Linear expansion coefficient (×10⁻⁷/° C., 50-350° C.) | 49 | 51 |  |  |  |
|  | Strain point (° C.) | 629 | 620 | 645 |  |  |
|  | $T_2$ (° C.) | 1516 | 1515 |  |  |  |
|  | $T_4$ (° C.) | 1160 | 1144 |  |  |  |
|  | Young's modulus (GPa) | 77 | 75 |  |  |  |
|  | $\Delta W_{HCl}$ (mg/cm²) | 0.42 | 0.34 |  |  |  |

TABLE 7

| Mass % | 1 | 2 | 3 | 4 | 5 | 6 | 7 | 8 | 9 | 10 |
|---|---|---|---|---|---|---|---|---|---|---|
| $SiO_2$ | 51.4 | 53.9 | 55.3 | 56.8 | 51.4 | 54.3 | 55.9 | 57.6 | 53.7 | 56.4 |
| $Al_2O_3$ | 16.0 | 16.8 | 17.2 | 17.7 | 13.1 | 13.8 | 14.2 | 14.7 | 13.2 | 13.9 |
| $B_2O_3$ | 7.9 | 8.3 | 8.6 | 8.8 | 7.9 | 8.4 | 8.6 | 8.9 | 8.0 | 8.4 |
| MgO | 4.0 | 4.2 | 4.3 | 4.4 | 4.0 | 4.3 | 4.4 | 4.5 | 4.1 | 4.3 |
| CaO | 0.0 | 5.9 | 9.0 | 12.4 | 0.0 | 6.8 | 10.4 | 14.3 | 0.0 | 6.0 |
| SrO | 20.7 | 10.9 | 5.6 | 0.0 | 23.6 | 12.5 | 6.4 | 0.0 | 20.9 | 11.0 |
| BaO | 0.0 | 0.0 | 0.0 | 0.0 | 0.0 | 0.0 | 0.0 | 0.0 | 0.0 | 0.0 |

TABLE 8

| Mass % | 11 | 12 | 13 | 14 | 15 | 16 | 17 | 18 | 19 | 20 |
|---|---|---|---|---|---|---|---|---|---|---|
| $SiO_2$ | 57.9 | 59.4 | 53.8 | 56.1 | 57.3 | 58.6 | 56.2 | 58.6 | 59.9 | 61.3 |
| $Al_2O_3$ | 14.3 | 14.6 | 16.2 | 16.9 | 17.3 | 17.6 | 13.4 | 14.0 | 14.3 | 14.6 |
| $B_2O_3$ | 8.7 | 8.9 | 8.0 | 8.4 | 8.6 | 8.8 | 8.1 | 8.5 | 8.7 | 8.9 |
| MgO | 4.4 | 4.5 | 4.1 | 4.3 | 4.3 | 4.4 | 4.1 | 4.3 | 4.4 | 4.5 |
| CaO | 9.2 | 12.5 | 0.0 | 5.1 | 7.8 | 10.6 | 0.0 | 0.0 | 7.9 | 10.7 |
| SrO | 5.6 | 0.0 | 17.9 | 9.4 | 4.8 | 0.0 | 18.2 | 9.5 | 4.8 | 0.0 |
| BaO | 0.0 | 0.0 | 0.0 | 0.0 | 0.0 | 0.0 | 0.0 | 0.0 | 0.0 | 0.0 |

INDUSTRIAL APPLICABILITY

The present invention provides an alkali-free glass which is suitable for glass substrates for various display devices such as liquid crystal display devices, or photomasks, and which contains substantially no alkali metal oxide and can be formed by a float process, and a liquid crystal display panel using it.

The entire disclosures of Japanese Patent Application No. 2003-434936 filed on Dec. 26, 2003 and Japanese Patent Application No. 2004-125732 filed on Apr. 21, 2004 including specifications, claims and summaries are incorporated herein by reference in their entireties.

What is claimed is:

1. An alkali-free glass comprising, as represented by mol %:

| $SiO_2$ | 60 to 64%, |
|---|---|
| $Al_2O_3$ | 0 to 12%, |
| $B_2O_3$ | 5 to 10%, |
| MgO | 6 to 18%, |
| CaO | 0 to 18%, |
| SrO | 0 to 18%, |
| BaO | 0 to 2%, |
| CaO + SrO | 12 to 25%, |
| MgO + CaO + SrO + BaO | 18 to 30%, | wherein the alkali-free glass contains substantially no alkali metal oxide and has a temperature $T_2$, at which the viscosity becomes log η=2, of at most 1,600° C., and a temperature $T_4$, at which the viscosity becomes log η=4, of at most 1,200° C.

2. The alkali-free glass according to claim 1, wherein $B_2O_3$ is from 7 to 10%, CaO+SrO is from 12 to 25% and MgO+CaO+SrO+BaO is from 21 to 30%, as represented by mol %.

3. The alkali-free glass according to claim 1, which contains substantially no $P_2O_5$, PbO, $As_2O_3$, $Sb_2O_3$ or ZnO.

4. The alkali-free glass according to claim 1, which has a linear expansion coefficient of at most 52×10⁻⁷/° C. within a range of from 50° C. to 350° C.

5. A liquid crystal display panel, wherein the alkali-free glass as defined in claim 1 is used as at least one substrate among the pair of substrates constituting a cell.

6. The alkali-free glass according to claim 1, wherein $SiO_2$ is from 60 to 63%, as represented by mol %.

7. The alkali-free glass according to claim 1, wherein MgO is from 7 to 18%, as represented by mol %.

8. A process for producing an alkali-free glass, which comprises:

mixing glass components so that the desired composition comprises, as represented by mol %:

| | |
|---|---|
| SiO$_2$ | 60 to 64%, |
| Al$_2$O$_3$ | 0 to 12%, |
| B$_2$O$_3$ | 5 to 10%, |
| MgO | 6 to 18%, |
| CaO | 0 to 18%, |
| SrO | 0 to 18%, |
| BaO | 0 to 2%, |
| CaO + SrO | 12 to 25%, and |
| MgO + CaO + SrO + BaO | 18 to 30%, | wherein the alkali-free glass contains substantially no alkali metal oxide and has a temperature $T_2$, at which the viscosity becomes log η=2, of at most 1,600° C., and a temperature $T_4$, at which the viscosity becomes log η=4, of at most 1,200° C.;

heating and melting the mixed glass components within a temperature range of from 1,500° C. to 1,660° C.; and forming the molten glass by a float process to produce the alkali-free glass.

9. The process for producing an alkali-free glass according to claim 8, wherein B$_2$O$_3$ is from 7 to 10%, CaO+SrO is from 12 to 25% and MgO+CaO+SrO+BaO is from 21 to 30%, as represented by mol %.

10. The process for producing an alkali-free glass according to claim 8, wherein at the time of melting the glass components, from 0 to 4 wt % of F, from 0 to 4 wt % of Cl, from 0 to 4 wt % of SO$_3$, from 0 to 4 wt % of SnO$_2$, from 0 to 4 wt % of TiO$_2$, from 0 to 4 wt % of CeO$_2$, from 0 to 4 wt % of ZrO$_2$, and from 0 to 2 wt % of Fe$_2$O$_3$, are further added as refining agents so that from 1 ppm to 15 wt % of F+Cl+SO$_3$+SnO$_2$+TiO$_2$+CeO$_2$+ZrO$_2$+Fe$_2$O$_3$, based on a total weight of the glass, are present in the glass after the formation.

11. The process for producing an alkali-free glass according to claim 8, wherein SiO$_2$ is from 60 to 63%, as represented by mol %.

12. The process for producing an alkali-free glass according to claim 8, wherein MgO is from 7 to 18%, as represented by mol %.

* * * * *